United States Patent
Raghu et al.

(10) Patent No.: US 9,701,241 B2
(45) Date of Patent: Jul. 11, 2017

(54) EARLY DETECTION OF TURNING AND AUTOMATIC RESPONSE BY THE VEHICLE

(71) Applicants: VOLKSWAGEN AG, Wolfsburg (DE); AUDI AG, Ingolstadt (DE)

(72) Inventors: Kaushik Raghu, Redwood City, CA (US); Premkumar Natarajan, Belmont, CA (US)

(73) Assignee: Volkswagen AG and Audi AG (DE)

( * ) Notice: Subject to any disclaimer, the term of this patent is extended or adjusted under 35 U.S.C. 154(b) by 0 days.

(21) Appl. No.: 14/857,390

(22) Filed: Sep. 17, 2015

(65) Prior Publication Data
US 2017/0080853 A1    Mar. 23, 2017

(51) Int. Cl.
| G01C 21/26 | (2006.01) |
| B60Q 1/34 | (2006.01) |
| B60R 1/00 | (2006.01) |
| H04N 5/225 | (2006.01) |
| G06K 9/00 | (2006.01) |

(52) U.S. Cl.
CPC ............... *B60Q 1/346* (2013.01); *B60R 1/00* (2013.01); *G01C 21/26* (2013.01); *G06K 9/00791* (2013.01); *G06K 9/00818* (2013.01); *H04N 5/2251* (2013.01); *B60R 2300/80* (2013.01)

(58) Field of Classification Search
CPC combination set(s) only.
See application file for complete search history.

(56) References Cited

U.S. PATENT DOCUMENTS

| 5,654,892 | A * | 8/1997 | Fujii | G08G 1/0969 340/988 |
| 5,902,350 | A * | 5/1999 | Tamai | G01C 21/3655 340/995.2 |
| 6,204,759 | B1 * | 3/2001 | Jahnke | B60Q 1/40 200/61.27 |
| 6,268,794 | B1 * | 7/2001 | Tzanev | B62J 27/00 340/427 |
| 9,164,511 | B1 * | 10/2015 | Ferguson | G05D 1/0246 |
| 2003/0078728 | A1 * | 4/2003 | Engelsberg | G01C 21/365 701/431 |
| 2004/0143381 | A1 * | 7/2004 | Regensburger | B60Q 1/346 701/36 |
| 2005/0154505 | A1 * | 7/2005 | Nakamura | G01C 21/365 701/1 |
| 2012/0239269 | A1 * | 9/2012 | Bonne | G08G 1/16 701/96 |
| 2012/0271510 | A1 * | 10/2012 | Seymour | B60Q 1/346 701/36 |

(Continued)

FOREIGN PATENT DOCUMENTS

| DE | 102007048848 A1 | 4/2009 |
| DE | 102009039084 A1 | 3/2011 |

(Continued)

*Primary Examiner* — Edward J Pipala
(74) *Attorney, Agent, or Firm* — Barnes & Thornburg LLP

(57) ABSTRACT

A system and method for early detection of turning intent and automatic actuation of a turn signal in a vehicle is provided. The system has an image recognition system and turn determination unit for identifying turn predictors and processing them to determine if a turn is about to happen. In response, a corresponding turn signal is automatically initiated for a predetermined period of time, and further vehicle systems can be updated.

19 Claims, 4 Drawing Sheets

(56) References Cited

U.S. PATENT DOCUMENTS

2014/0309855 A1* 10/2014 Tran .................... B60Q 1/38
                                                                    701/36

FOREIGN PATENT DOCUMENTS

| DE | 102010063801 A1 | 6/2012 |
| EP | 2144086 A1 | 1/2010 |
| JP | 2008290669 A | 12/2008 |

* cited by examiner

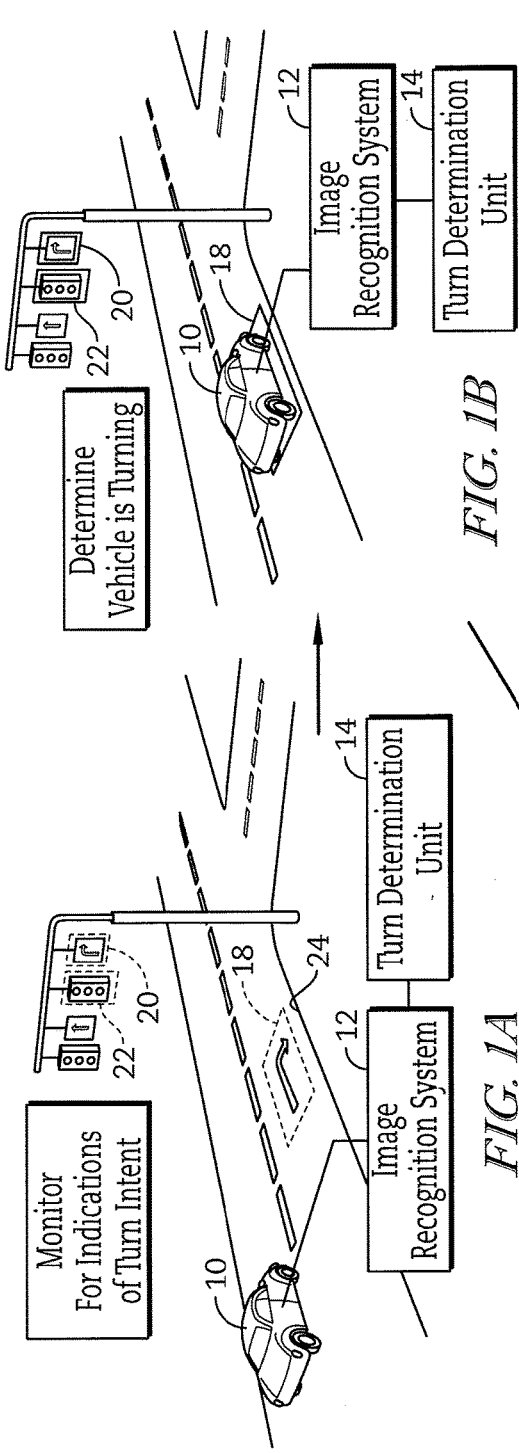
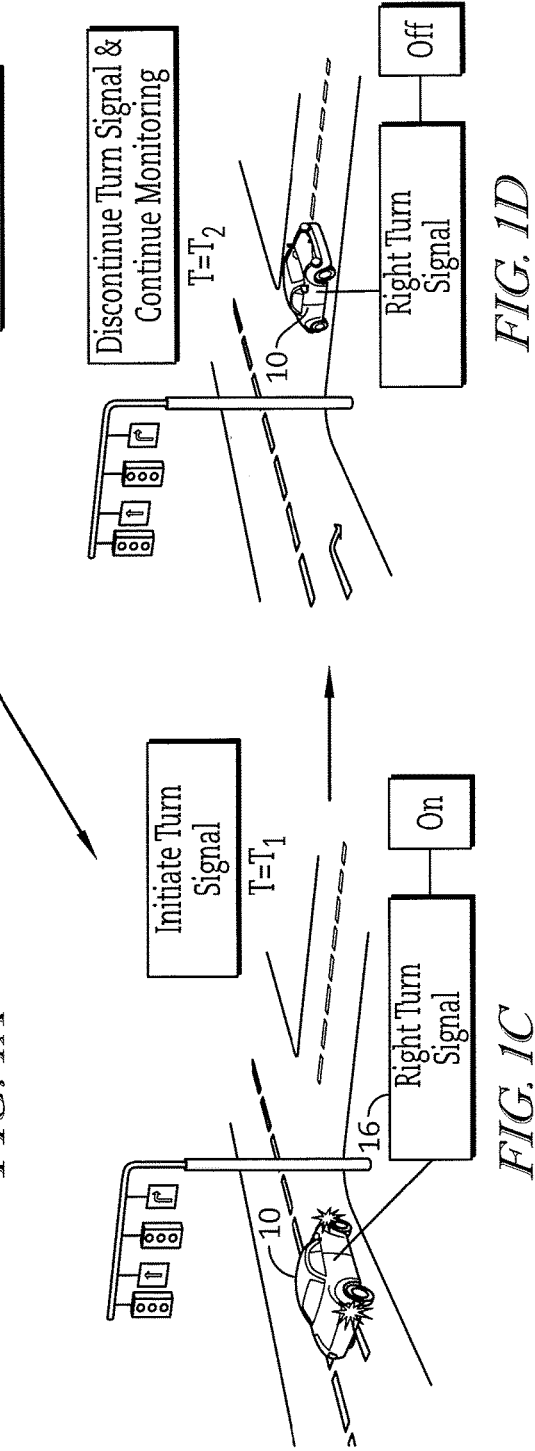

EARLY DETECTION OF TURNING AND AUTOMATIC RESPONSE BY THE VEHICLE

BACKGROUND

The present disclosure relates to systems, components, and methodologies for automatically detecting and responding to vehicle maneuvers. In particular, the present disclosure relates to systems, components, and methodologies for automatically detecting a vehicle is going to turn and activating a turn signal.

SUMMARY

According to the present disclosure, systems, components, and methodologies are provided for automatically detecting a vehicle is going to turn and activating a turn signal.

In illustrative embodiments, an in-vehicle system for detecting if a vehicle is about to turn has one or more sensors that detect one or more turn predictors. A turn determination unit in a vehicle controller is programmed to process the predictors and determine whether the vehicle is about to turn. In response to that determination, the controller then activates a turn signal to notify other vehicles that the vehicle is about to turn.

In illustrative embodiments, sensors may include at least one camera integrated into an image recognition system that identifies road predictors, sign predictors, traffic light predictors or other vehicle predictors that the vehicle is about to turn. Additionally, speed sensors and navigational sensors may be used by the turn determination unit.

In other illustrative embodiments, an in-vehicle system for detecting if a vehicle is about to turn comprises an image recognition system configured to detect one or more turn predictors and a processor on which is stored computer code which, when executed on the processor, causes the system to determine whether the vehicle is about to turn based on one or more turn predictors detected by the image recognition system. The processor may then automatically update the function of one or more components in the vehicle based on that determination. The functions may include actuation of a turn signal indicator, updating route guidance and vehicle position in a GPS, providing updates to a driver assistance system, etc.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1A-1D constitute a diagrammatic and perspective view of an exemplary automatic early detection of turning and signaling process showing a first point where a sensor system monitors for indications of turn intent, a second point where the sensor system determines the vehicle is turning based on indicators identified by an image recognition system, a third point where the a vehicle controller automatically turns on a corresponding turn signal prior to turning, and a fourth point where the vehicle makes the turn and the turn signal indicator is turned off;

FIG. 1A is a perspective view of a vehicle in a lane and road, sign, and traffic light turn indicators in the right lane;

FIG. 1B is a perspective view of the image recognition system identifying the turn indicators in the right lane and the turn determination unit determining that the vehicle is turning right as the vehicle passes over the road turn indicator;

FIG. 1C is a perspective view of a vehicle where a controller has initiated a right turn signal indicator based on the determination that the vehicle is turning right;

FIG. 1D is a perspective view of the vehicle having completed the turn and the turn signal indicator automatically turning off after a predetermined period of time;

Figure 2:
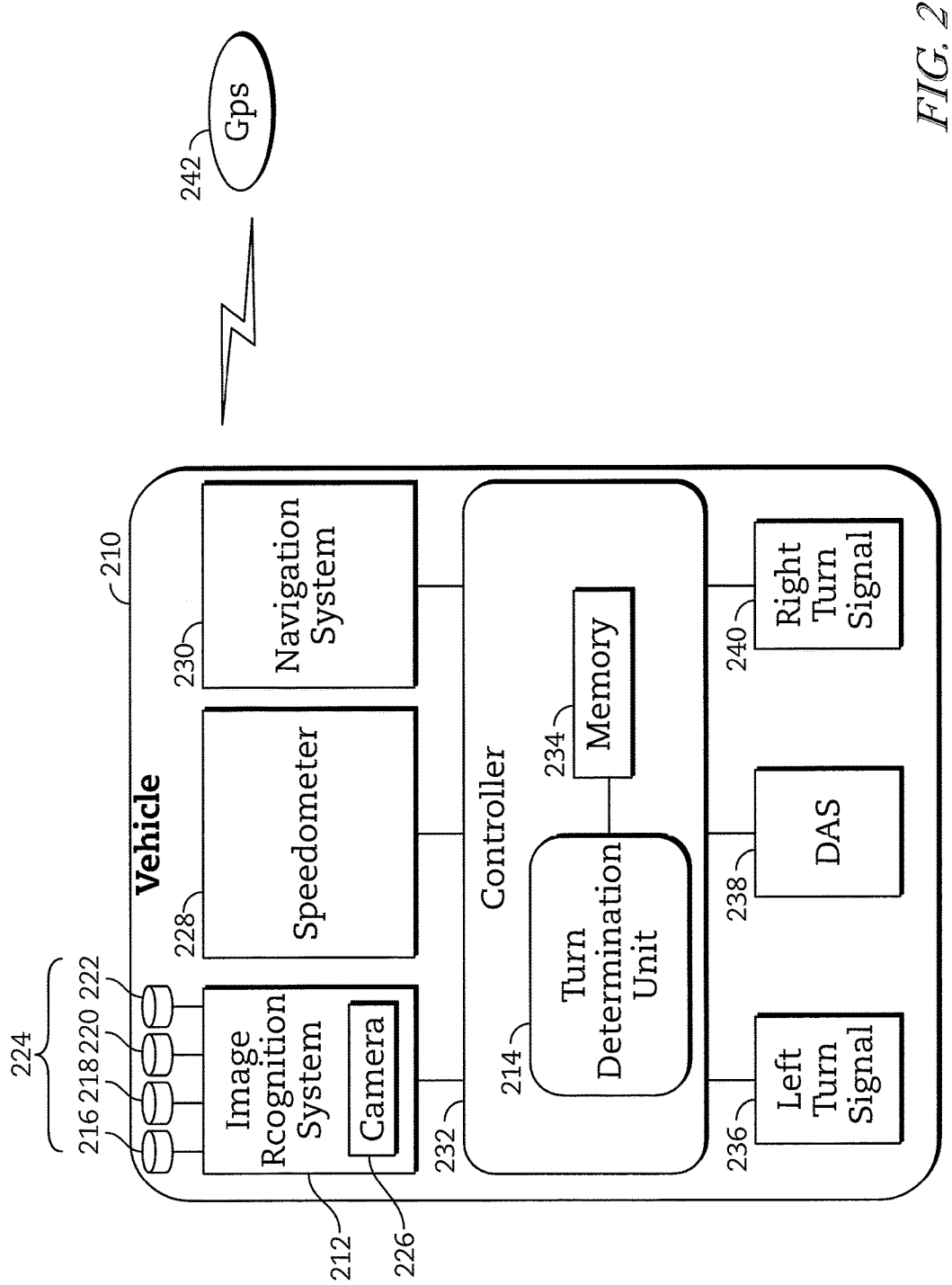
FIG. 2 is a diagrammatic view of the detection and automatic response system integrated into a vehicle including an image recognition system, speedometer and navigation systems, and a controller having a memory and a turn determination unit to control a driver assistance system and turn signal indicators.
Figure 3:
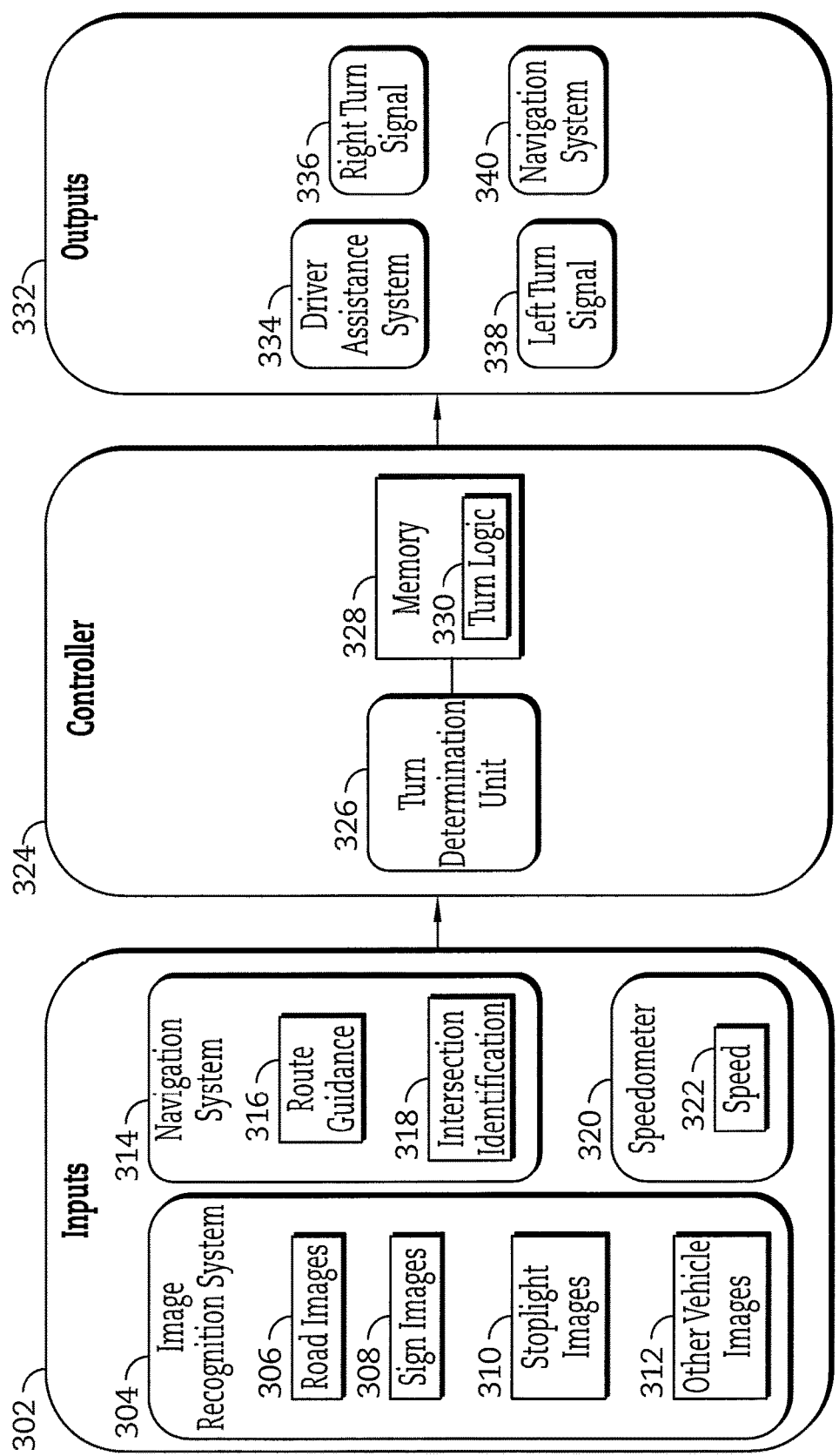
Figure 4:
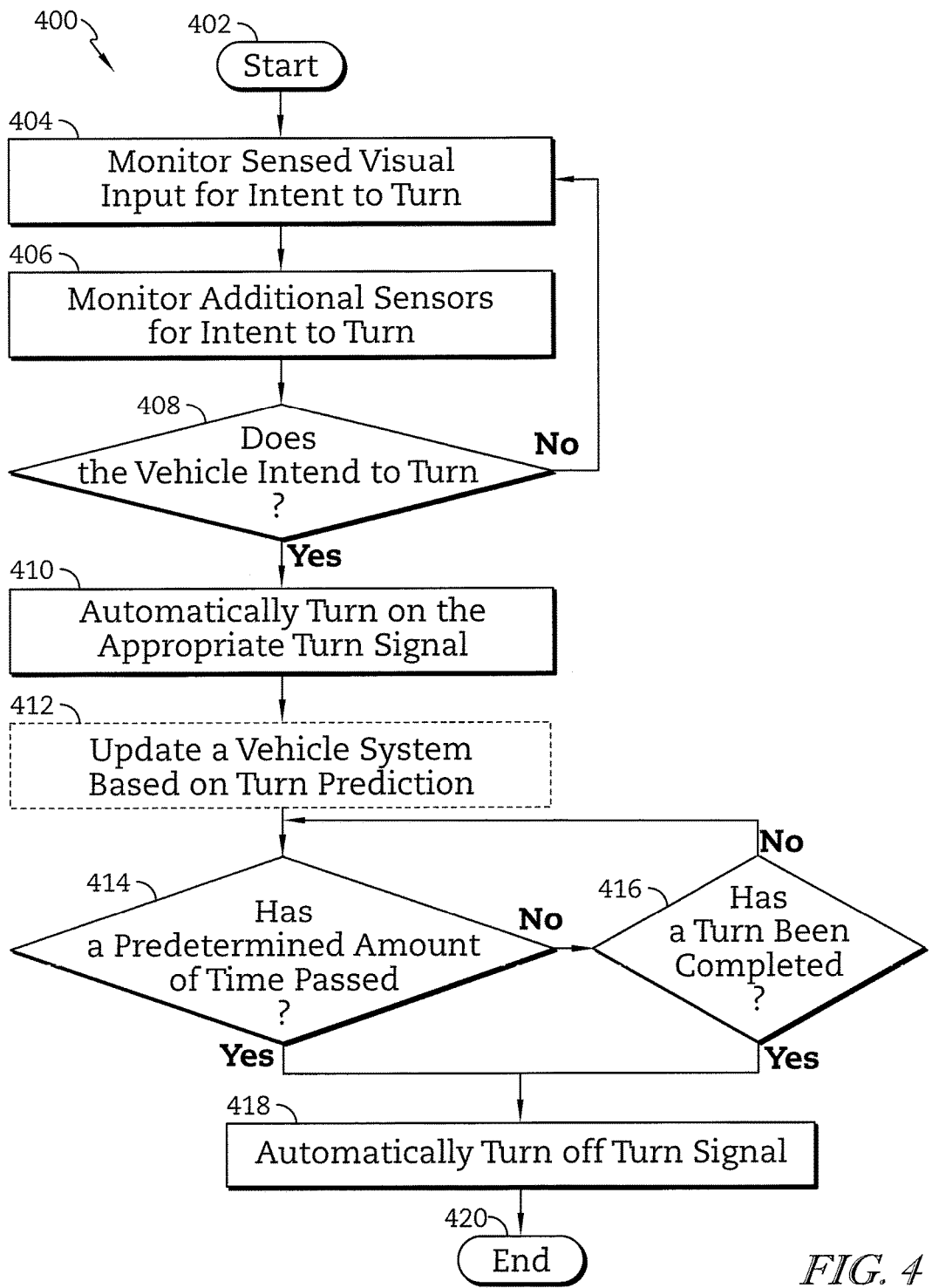

FIG. 3 is a detailed diagrammatic view of the detection and automatic response system including the sensor inputs, the controller storing turn logic and the outputs that can be automatically controlled by the controller based on a determination by the turn determination unit that the vehicle is going to turn; and FIG. 4 is a flow diagram of the detection and automatic response process implemented by the system shown in FIG. 2.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

A system 200 for determining whether a vehicle is about to turn that performs various operations automatically in response is shown in FIGS. 1-3. The system includes 200 includes computer code that can be loaded onto an in-vehicle turn determination unit, or processor 214 for execution to automatically evaluate sensed inputs and determine whether a vehicle is about to turn and in what direction. When the processor 214 determines a vehicle is about to turn and in a particular direction, the processor 214 automatically updates one or more vehicle outputs. System 200 monitors for indications of turn intent and based on the indications; determine the vehicle is about to turn as indicated in FIGS. 1A-1B. As seen, image recognition system 12 may include one or more cameras mounted to the vehicle 10 to capture images external to the vehicle. Captured images are sent to image recognition system 12 which can be configured to detect road indicators 18, traffic light indicators 22, sign indicators 20, or other vehicle indicators (not shown). Turn determination unit 14 then uses these features to make an automatic determination as to whether the vehicle is about to make a turn, and in what direction.

For example, when a vehicle 10 drives directly over a road indicator 18, the turn determination unit 14 may make a determination that the vehicle is about to turn. Further indicators such as traffic light indicators 22 and/or sign indicators 20, wherein images of such indicators are captured directly in front of the path of travel of vehicle 10 provide further data in support of the determination the vehicle 10 is about to turn. In this example, the road indicator 18 and the sign indicator 20 indicate the direction of the turn will be to the right. Based on this determination, the right turn signal 16 may be automatically turned on, as seen in FIG. 1C, without requiring driver input. Upon completion of the turn, as seen in FIG. 1D, or upon passing of a predetermined period of time (T2), the right turn signal 16 may be automatically turned off and the system may continue to monitor for indication of turn intent.

In more detail, with reference to FIG. 2, the system 200 may include an image recognition system 212, a speedometer 228, and a navigation system 230 that can all send turn indicators information to a controller 232. The controller 214 can process the turn indicators in a turn determination unit 214 that can have programmable instructions stored in memory 234 to determine whether the vehicle 210 is about to turn in a particular direction. Based on the determination of a turn, the controller 214 can activate and or update one or more of left and right turn signals 236 240, driver assistance system 238, and navigation system 230.

Image recognition system 212 includes one or more, perception sensors, or cameras 226 mounted to the vehicle 210 to capture image data outside the vehicle 210. Image recognition system 212 may recognize directional arrows painted on the road, or other directional road indicators, turn signage indicators, traffic lights, and when a turn signal has been actuated on a vehicle directly in front of the vehicle 210. For example, image recognition system 212 may include a plurality of databases 224 including a road database 216, a sign database, 218 a traffic light database 220, and a vehicle database 222 that contain training data in the form of images known to contain various types of turn indicators and images not known to contain turn indicators. In some embodiments the databases may be updatable cloud based databases. The training data can be used to generate a statistical classification algorithm that classifies a given sample of image data based on whether that sample is likely to include a turn indicator, and if so, what type of indicator.

Image recognition system 212 may then perform pixel-based segmentation of captured frames of image data to apply sub-windowing schemes, such as sliding window detection, to the captured frames of image data in order to identify candidate sub-windows that may contain images of the various road, sign, traffic light, and vehicle indicators. For each candidate sub-window, the image recognition system 214 may apply the statistical classification algorithm to form a prediction on whether the sub-window contains an indicator and, if so, the type of indicator contained in the sub-window.

Speedometer 228 may be the speedometer typically installed in a vehicle and relay the speed as an additional input for determining turning is imminent. Furthermore, navigation system 230 may communicate with GPS 242 and provide location of intersections or even the location of a next turn in a navigation guidance being executed.

Controller 232 may include turn determination unit 214. Turn determination unit 214 may have turn logic stored in a memory 234. Based on the number of indicators sent from one or all of the image recognition system 212, speedometer 228, and navigation system 230, the turn determination unit 214 may assign different weighting factors or rank of importance to each indicator in making a determination whether the vehicle 210 is about to turn or not. Additional sensors that provide turn indicator information may be incorporated into the system 200. For example, if the vehicle is equipped with beacon technology, this may be utilized along with the imaging sensors to predict a turn.

If turn determination unit 214 determines a turn is imminent, then it may activate a left or right turn signal 236, 240 corresponding to the direction of turn that is imminent and prior to the start of the turn. Additionally, the turn determination unit may send a signal to the navigation system 230 to update route guidance based on the turn and prior to the turn. Controller 323 may also use the determination that the vehicle 210 is about to turn to update a driver assistance system.

In more detail as seen in FIG. 3, inputs 302 include one or more of road indicators 306, sign indicators 308, traffic light indicators 310, and other vehicle indicators 312. Inputs may also include one or more of speed 322, route guidance 316, and intersection identification 318. Examples of road indicators may include: painted arrows, a solid white line indicating the road shoulder, or the road ending in a forced merge situation. Examples of sign indicators include directional arrow signs, rotary signs, and lane ending or merge signs. Examples of traffic light indictors include directional arrow indicator lights, as well as red, green, and yellow lights. Indicators on other vehicles will include if a vehicle in front of the vehicle 210 has a turning signal on.

Turn determination unit 326 may collect any and all indicators from the inputs 302. In a preferred embodiment, at least image indicators from an image recognition system 304 are provided. The turn determination unit has a memory 328 with turn logic 330 stored therein to be implemented in making a determination if the vehicle is about to turn. For example, it may be required that a road indicator arrow 18, such as that shown in FIG. 1A be directly in front of the car in order to determine that the vehicle 210 is about to turn. In another example, the unit may determine that, when it receives an image of the white line indicating the shoulder of the road is to the left of the vehicle, and the vehicle is at a reduced speed, that the vehicle is about to turn right. In another example, a traffic light image may be green, the navigation route guidance 316 may indicate the vehicle is supposed to turn, and the speed 322 is reduced. Again, the turn determination unit 326 may conclude that the vehicle 210 is about to turn in the direction of the route guidance.

However, in some combinations, reduced speed may not indicate a turn is imminent. For example if a traffic light is yellow or red, the vehicle may simply be stopping and it may be determined the vehicle is not turning absent other turn indicators. In some embodiments, the turn determination unit may detect other types of turns such as forced merges via road indicator 18 arrows in a lane to move to another lane.

When the turn determination unit 326 determines from the one or more indicators that a turn is about to happen, controller 324 may automatically respond by actuating and/or updating one or more outputs 332. For example, if the turn determination unit determines the vehicle 210 is about to turn right, the right turn signal 336 may be activated whereas if it is determined the vehicle is about to turn left the left turn signal 338 may be activated. The signal may be activated and automatically shut off after a predetermined time, i.e., three seconds.

Alternatively, the signal may turn off after the turn has been completed as typically occurs in vehicles if the turn is completed before the predetermined time has elapsed. Alternatively and/or additionally, the controller 324 may signal navigation system to update, or recalculate, route guidance 316 in accordance with the determined turn so that a driver does not have to wait until after completion of the turn for the route to be recalculated. Controller 324 may also be configured to update a driver assistance system 334 with the turn information.

As illustrated in FIG. 4, in a method of operation 400, visual input is monitored for visual indicators of vehicle intent to turn 404. Additional sensors may also be monitored for intent to turn 406. A determination is made based on the sensed visual input and the additional sensed input whether the vehicle intends to turn 408. If it is determined no turn is intended, the process returns to monitoring the visual and other sensors for turn indicators. If it is determined that the vehicle intends to turn, the appropriate directional turn signal is activated automatically 410.

Optionally, other vehicle systems could be updated based on the turn prediction such as navigation, or driver assist systems mentioned above. Some examples of updates to driver assist systems include automatic lighting adjustment, dynamic steering adjustment, suspension adjustment, curb proximity lane centering. If a predetermined time has passed since signal activation 414, the signal automatically turns off 418. Otherwise, the signal turns off 420 after completion of the turn 416 as turn signals typically do in vehicles.

The above-described components, including the image recognition system 304, and turn determination unit, or processor, 326, may be implemented in software, compiled and stored to a memory as object code, and during operation of the vehicle, may be invoked for execution by one or more processors. In one implementation, the above-described components are implemented as a single system on a chip. The interconnections among the above-described components can be provided through any suitable electronic communication mechanism, such as a communication bus. Thus, yield determination system 200 may be implemented as software complied into object code on one or more memories that, during runtime, are invoked for execution by one or more processors. Databases of known feature images may be implemented in a database using any known database environment, such as Oracle, DB2, or SQL Server.

The system provides automated turn signal initiation to allow surrounding vehicles to be made aware of intent to turn. Sometimes, drivers fail to use turn signals due to stress, confusion, tiredness, laziness, hands being occupied, etc. Studies have found that nearly half of all drivers fail to use turn signals in turn-only lanes while less than one percent of drivers in turn only lanes do not turn after driving over a turn-only arrow. As result, there is a need for a system that alleviates miscommunications among vehicles due to human failure to initiate turn signals. The above described systems and methods solve this problem by implementing a technical solution in which the system automatically initiates the turn signal on behalf of the driver without intervention of the driver. The system further provides the further technical solution of a preset duration for the turn signal so that if the driver does not make a turn, the signal is discontinued to avoid further miscommunication.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for detecting a vehicle is about to turn comprising:
   one or more sensors configured to detect one or more turn predictors;
   left and right turn signal indicators to signal a direction the vehicle is about to turn; and
   means for determining the vehicle is about to turn based on input from the one or more sensors so that one of the left and right turn signal indicators is automatically activated based on the determination,
   wherein one of the right and left turn signal indicators is automatically deactivated after a predetermined amount of time has passed since one of the right and left turn signals is activated and the vehicle has not completed a turn.

2. The in-vehicle system of claim 1, wherein the means for determining includes a turn determination unit having a processor that uses turn logic to evaluate the inputs from the one or more sensors.

3. The in-vehicle system of claim 2, wherein the turn determination unit determines the vehicle is about to turn in response to detection of an arrow painted on a portion of a road that the vehicle passes over.

4. The in-vehicle system of claim 1, wherein the one or more sensors comprises an image recognition system including one or more cameras mounted in the vehicle.

5. The in-vehicle system of claim 4, wherein the image recognition system includes a one or more databases and a processor configured to compare the sensed images with stored turn predictor images to detect at least one or more visual turn predictors.

6. The in-vehicle system of claim 5, wherein the one or more visual turn predictors comprises at least one of: road turn predictors, sign turn predictors, traffic light turn predictors, or other vehicle turn predictors.

7. The in-vehicle system of claim 1, wherein the means for determining the vehicle is about to turn updates a navigation system in the vehicle based on the determination.

8. The in-vehicle system of claim 7, wherein the update to the navigation system comprises updated route guidance in response to the determination that the vehicle is about to turn.

9. An in-vehicle system for detecting a vehicle is about to turn comprising:
   an image recognition system configured to detect one or more turn predictors;
   a processor on which is stored computer code which, when executed on the processor, causes the system to:
      determine that the vehicle is about to turn based on one or more turn predictors detected by the image recognition system, and
      update the function of one or more components in the vehicle based on the determination,
   wherein the processor further determines the direction the vehicle is about to turn based on the one or more turn predictors and activates a corresponding turn signal for a predetermined time period and deactivates the corresponding turn signal after the predetermined time period has passed when no turn has occurred.

10. The in-vehicle system of claim 9, wherein the one or more components further comprise, a driver assistance system and a navigation system.

11. The in-vehicle system of claim 9, wherein the processor is further configured to receive inputs from a speedometer and a navigation system and determine the vehicle is about to turn based on inputs form the speedometer, the navigation system, and the image recognition system.

12. The in-vehicle system of claim 11, wherein the processor determines the vehicle is about to turn in response to one or more turn predictors from the image recognition system and a change in vehicle speed input from the speedometer.

13. The in-vehicle system of claim 11, wherein the processor determines the vehicle is about to turn in response to one or more turn predictors from the image recognition system and indication of an intersection ahead input from the navigation system.

14. The image recognition system of claim 9, wherein the processor is configured to determine the vehicle is about to turn based on the image recognition system detecting a turn arrow on a road directly in the forward path of the vehicle and to determine the vehicle is not about to turn based on the image recognition system detecting a turn arrow on a road offset from the forward path of the vehicle.

15. A method for determining a vehicle is about to turn and automatically controlling activation of a turn signal indicator, the method comprising:

detecting one or more visual turn predictors with an image recognition system;

determining the vehicle is about to turn based on the one or more detected visual indicators; and automatically controlling activation of a turn signal to indicate a turning direction corresponding to the determination the vehicle is about to turn, and automatically controlling deactivation of the turn signal after a predetermined time has passed and the vehicle has not turned.

16. The method of claim 15, further comprising detecting a change in speed of the vehicle, wherein a processor is configured to determine the vehicle is about to turn based on the one or more detected visual indicators and the change in speed.

17. The method of claim 16, wherein the one or more detected visual indicators comprises at least one of a road indicator, a sign indicator, a traffic light indicator and another vehicle indicator.

18. The method of claim 17, wherein detecting one or more visual turn predictors comprises detecting one or more painted indicators on a road the vehicle is travelling on.

19. The method of claim 15, wherein determining the vehicle is about to turn further comprises determining a direction the vehicle is about to turn.

* * * * *